(12) United States Patent
Koster

(10) Patent No.: US 6,668,755 B1
(45) Date of Patent: Dec. 30, 2003

(54) DEVICE FOR CARRYING OBJECTS

(76) Inventor: Berend Koster, 't Sander 8, NL-7522 Am Enschede (NL)

( * ) Notice: Subject to any disclaimer, the term of this patent is extended or adjusted under 35 U.S.C. 154(b) by 0 days.

(21) Appl. No.: 10/049,423

(22) PCT Filed: Aug. 11, 2000

(86) PCT No.: PCT/NL00/00561
§ 371 (c)(1),
(2), (4) Date: Jun. 19, 2002

(87) PCT Pub. No.: WO01/11947
PCT Pub. Date: Feb. 22, 2001

(30) Foreign Application Priority Data

Aug. 13, 1999 (NL) .............................................. 1012822

(51) Int. Cl.[7] .............................................. A01K 29/00
(52) U.S. Cl. ....................................................... 119/167
(58) Field of Search ................................ 119/167, 166, 119/170

(56) References Cited

U.S. PATENT DOCUMENTS

| | | | | |
|---|---|---|---|---|
| 3,809,013 A | * | 5/1974 | Rigney et al. ............... | 119/167 |
| 4,312,295 A | * | 1/1982 | Harrington ................... | 119/167 |
| 4,646,684 A | * | 3/1987 | Embry ......................... | 119/167 |
| 4,723,510 A | * | 2/1988 | Skillestad .................... | 119/167 |
| 4,779,567 A | * | 10/1988 | Smith .......................... | 119/165 |
| 4,870,924 A | * | 10/1989 | Wolfe .......................... | 119/167 |
| 5,121,712 A | * | 6/1992 | Schulein et al. ............. | 119/167 |
| 5,207,772 A | * | 5/1993 | Lauretta et al. ............. | 119/167 |
| 5,325,815 A | * | 7/1994 | Gumpesberger ............ | 119/166 |
| 5,752,466 A | * | 5/1998 | Lundeen et al. ............ | 119/167 |

* cited by examiner

*Primary Examiner*—Charles T. Jordan
*Assistant Examiner*—John W. Zerr

(57) ABSTRACT

Device (1) for carrying objects, in particular excrement. This device consists of a film sheet which is provided with openings (3–5) and is placed on the base of a cat litter tray. The cat litter tray is then filled with grit in the conventional manner. To remove excrement the user has to grasp the film at handles (7) in the film sheet which extend outside the cat litter tray close to the ends. The openings (3–5) are made such that excrement cannot pass through openings but the cat litter grit will remain on the base of the cat litter tray. Optionally a number of such film sheets can be placed on top of one another for regular removal of excrement without a large quantity of grit being consumed.

8 Claims, 2 Drawing Sheets

DEVICE FOR CARRYING OBJECTS

The present invention relates to a device for carrying objects, in particular cat excrement, comprising a sheet of film-like material according to the preamble of claim 1.

A film of this type is disclosed in U.S. Pat. No. 5,121,712A. A number of sheets can be positioned above each other having the holes of the several sheet registered.

From U.S. Pat. No. 4,312,295A a film sheet is known, which is provided with openings and is fixed to the cat litter tray or the like with the aid of clamps. If the cat litter tray has become soiled, the film sheet can be gathered together as a bag and be removed together with all the cat litter.

The intention with such a device is, in the course of time, to sieve out the "unused" grit material onto a subsequent sheet when removing a sheet of film material and to take up and remove the used grit material, that has been agglomerated by the excrement, with the film material.

Although such a construction works well in principle, the use of clamps is laborious. On the other hand, clamps are necessary because otherwise the film material shifts out of place and can be pushed away by the animal concerned.

In U.S. Pat. No. 4,784,082 a construction is proposed with which a screen base is enclosed within a box. The sheet material is positioned with the aid of bands which are fitted at the ends of the sheet material and clamps in the corners.

In DE 29.621.334 U1 a screen construction is proposed which is placed on the base of the cat litter tray, after which the tray is filled with grit. To counteract shifting of this net-like construction the latter is clamped at the rim of the cat litter tray with the aid of a frame. A sort of drawstring is fitted at the periphery of the net-like construction. If there is excrement in the cat litter tray the user removes the net from the cat litter tray by detaching the frame construction, to which the net is clamped, from the tray, grasping the net at the sides and lifting it out of the tray using the drawstring. By this means excrement and the like should remain behind on the net and non-soiled litter fall back into the cat litter tray through the meshes of the net. The aim with this construction is to achieve a saving in the quantity of cat litter used. This construction offers no solution with regard to hygiene since for this use is made of the film sheet already described. However, it is dubious whether the construction works. A net has the characteristic that it cannot be made to lay flat, as a result of which it is susceptible to cat vandalism and gaps are produced between the net and the tray. If several nets are now placed on top of one another (the user is free to do this) the soiling will, in view of the open structure and fine mesh of a net, spread between the various nets and below them where it sticks together. The consequence of this when removing a net is that the soiling breaks up and soils the contents of the tray to such an extent that complete replacement is necessary. An additional disadvantage is that a net closes up when being removed from the tray and the meshes consequently become constricted, as a result of which there can be and will be no sieving and separating effect. Moreover, in our opinion, this cleaning system consisting of three products is complex.

The aim of the present invention is to provide an improved device with which it is possible to remove excrement from a cat litter tray without also removing litter which is still properly usable, whilst as far as hygiene is concerned the cleaning process is optimised by a single operation, and with which it can be guaranteed that the film material remains in place without particular complex measures being required.

This aim is achieved with the device as described above having the characterising features of claim 1.

Said aim is achieved with the device described above in that the sheet of film material is essentially rectangular, cut-outs being made at each of the corner points.

As a result of this the film can be made to lay flat and is also resistant to cat vandalism. During use, the central section of the film sheet can be placed on the base of the cat litter tray in the manner described above, whilst a portion of material protrudes on at least two sides and hangs down over the tray. With the counter-weight created by this means the construction is so stable that no shifting occurs. The stabilising effect is also supported by the pressure of the litter in the tray on the film sheet.

Simple removal of the film sheet is achieved in that said sheet is provided with carrying handles close to the periphery. These carrying handles can have been made in the film material but can also comprise bands or the like.

The openings in the film sheet can have any imaginable shape. In a particularly simple embodiment said openings are made round. It is also possible to make said openings in slit form. This can be achieved either by making a simple, optionally crossways, cut or by punching out an elongated opening. It has been found that if at least one main dimension of said openings is between 10 and 17 mm in the use position good separation can be achieved between excrement and cat litter.

According to an advantageous embodiment the openings are made by punching. However, during the punching operation the material is not completely separated so that the punched out material remains joined to the main material of the film sheet with the aid of a bridge or the like. With this arrangement it is possible, for example, in the case of a circular opening to make the "island" joined with the aid of a bridge the same shape. However, it is also possible to split the opening into various sections and to join each of these to the film sheet with the aid of a bridge.

According to an advantageous embodiment of the invention a combination is provided that comprises a number of the devices, that is to say film sheets, described above. These sheets are placed on top of one another and laid in the cat litter tray at the same time.

When cleaning for the first time the top film layer is removed from the film layers located beneath it, transporting the excrement at the same time and leaving behind the clean cat litter. The next film sheet is removed during a subsequent cleaning operation, etc. In this way the cat litter tray can be cleaned very regularly in a particularly hygienic manner without this immediately being associated with a high consumption of litter material.

With this arrangement it is possible for the openings in successive film sheets to be arranged in line. To prevent underlying film sheets also moving when the top sheet is removed (this can occur if the openings have been punched out completely) it is preferable to arrange this construction such that the openings are not in line.

It has been found that an appreciable saving in litter can be obtained with the construction according to the invention. A reduction of 50–70% can be achieved without too many problems. That is to say the grit yield rises to above 90%. If a pack of, for example, 7–10 sheets is used it is possible for approximately three weeks to do no more than simply regularly remove one of the sheets of film material and to top up with litter to compensate for the grit removed with the excrement.

It will be understood that the film can comprise any film known in the prior art. One example of such a film is polypropene. Preferably, this film consists of a biodegradable material, such as champ foil. With such an application the film can be removed together with the excrement in an environmentally friendly manner, that is to say can be deposited in the vegetable and garden waste container. This also results in an advantage for local authorities. However, the film can also be made of non-plastic materials or combinations of non-plastic materials (such as paper-like materials) and film layers or plastic layers impregnated therein.

The invention will be explained in more detail below with reference to an illustrative embodiment shown in the drawing. In the drawing.

Figure 1:
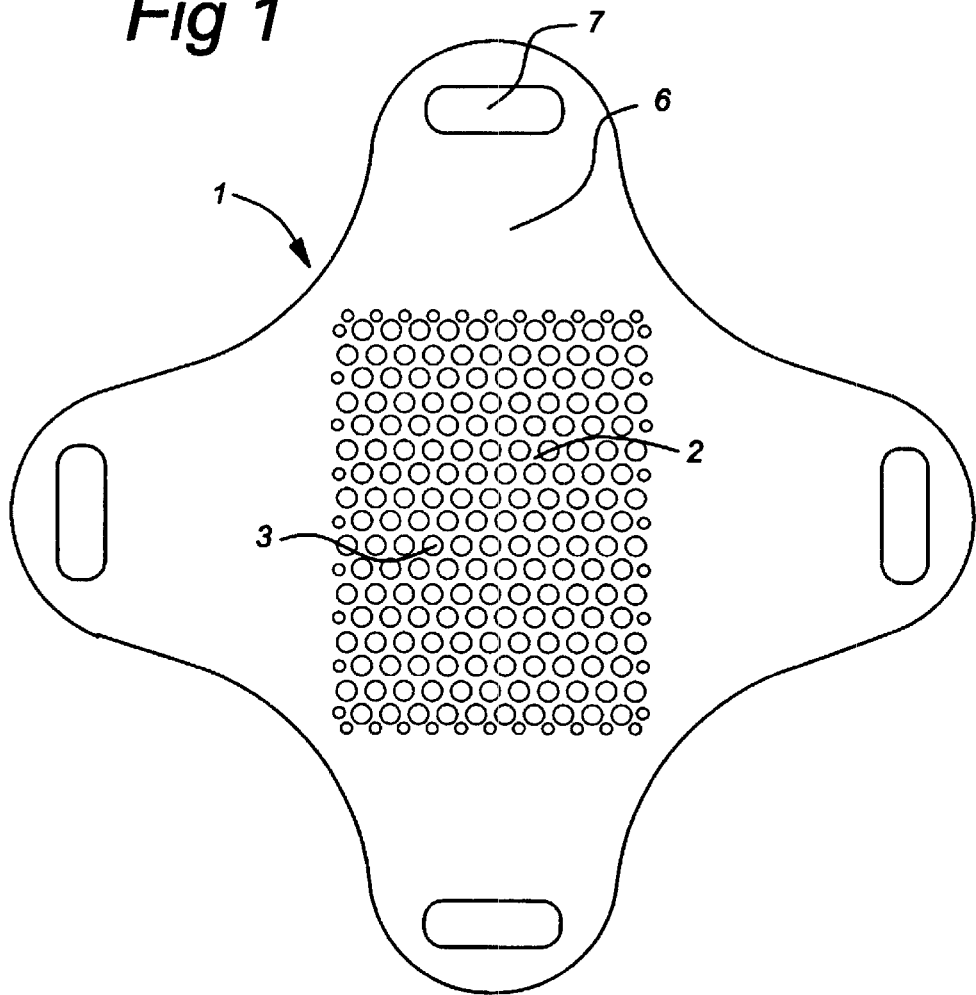
FIG. 1 shows a sheet of film material according to the invention in the unfolded position.
Figure 2:
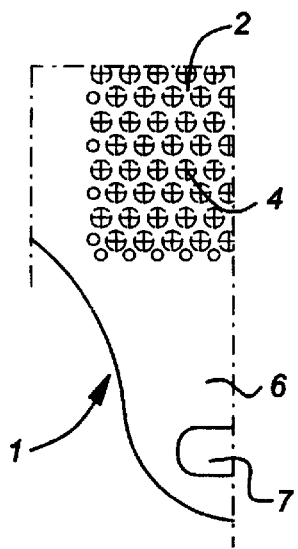
FIGS. 2–4 show sections of the sheet in various embodiments.
Figure 3:
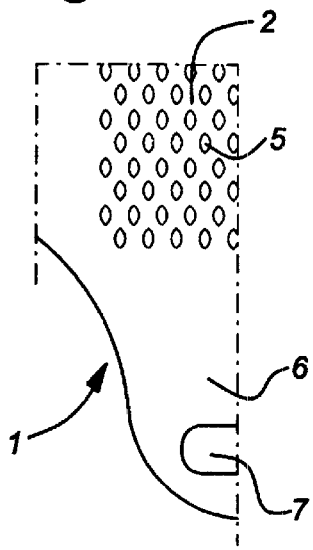
Figure 4:
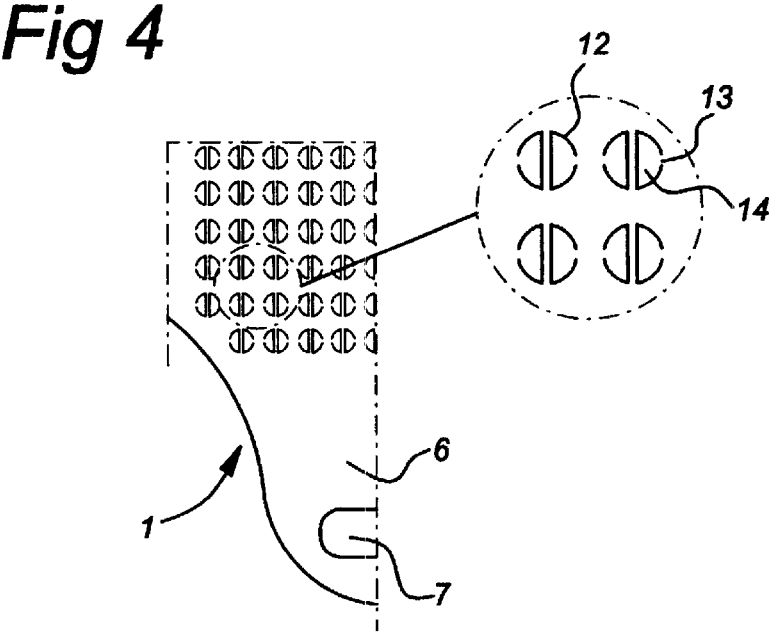

In FIG. 1 a film sheet according to the invention is indicated by 1. In the preferred embodiment this sheet is made of polypropene material such as Ecoflex® and is provided with a central section 2 around which flaps 6 are arranged. These flaps 6 are produced when making cut-outs close to the corner points of the central section. Flaps 6 are provided with handles 7 integral in the film material. When bringing the handles 7 towards one another a more or less closed cat litter tray sieving bag is produced. Since a section of the film sheet hangs down outside the tray, stability is obtained as a result of the weight thereof. Because of the lack of corner sections, flat contact with the tray can be obtained so that the risk of the top sheet of film material shifting is prevented as far as possible. Said cat litter tray sieving bag is provided with openings which are indicated by 3. 3 indicates a circular (optionally partially) punched out opening. In FIG. 2 an opening 4 which is formed by two cuts oriented perpendicularly to one another is shown as a variant. In FIG. 3 opening 5 indicates a punched-out slit-like opening. It will be understood that the openings can have any shape which is known in the prior art and is desirable for the use of the present invention. A further variant is shown in FIG. 4. This figure is in more detail than FIGS. 2 and 3. The openings are indicated by 12. These openings are circular in the illustrative embodiment shown but can have any desired shape. The material within the openings has been partially punched out and partially not punched out. The part that has not been punched out is indicated by 13 and in fact forms a bridge between the film material and the punched-out part 14. This punched-out part 14 is semicircular. By this means a type of hinge action is obtained, as a result of which discharge of unused grit material is optimised. The resistance of such a closure is particularly low.

Figure 5:
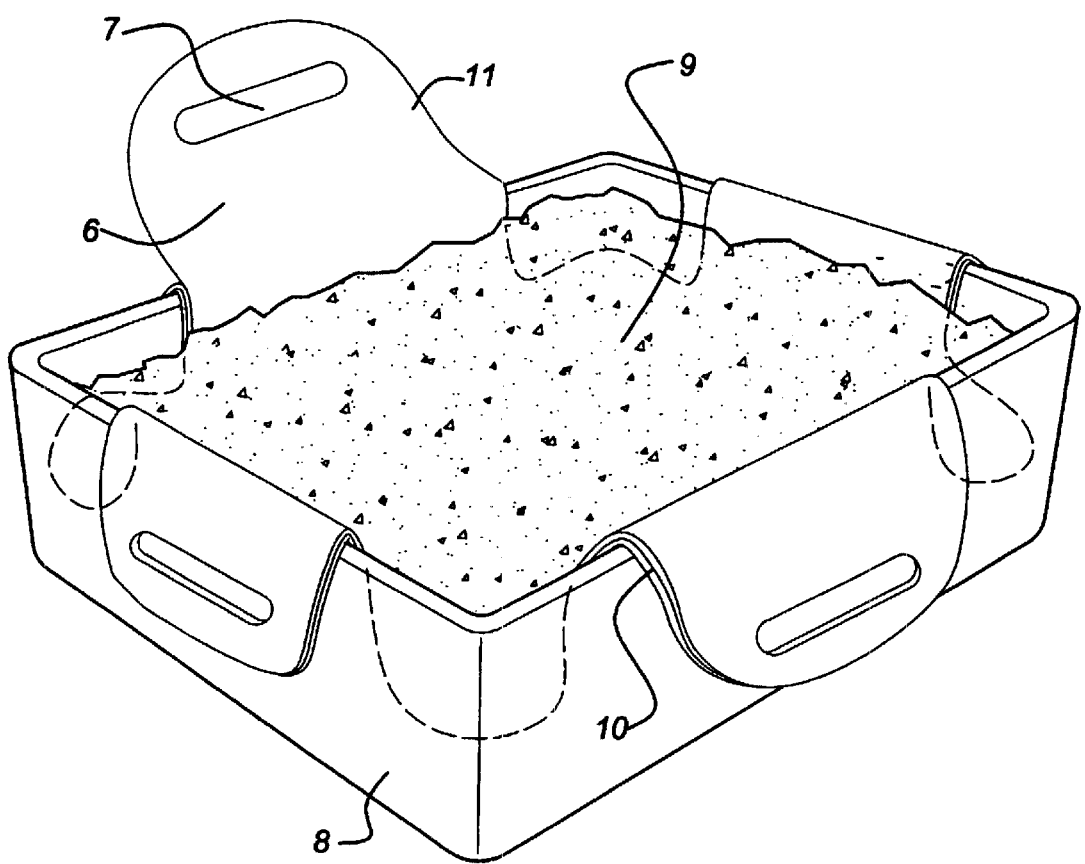
FIG. 5 shows the use of a pack of film sheets according to the invention.

In FIG. 5 the use of the sheet of film material together with further sheets of material is shown. The pack formed in this way is indicated by 10. The cat litter tray itself is indicated by 8. It can be seen that the flaps 6 always extend over the edge of the tray on four sides. Litter 9 that can be grit is placed on top of the film material. The grit can comprise any material known in the prior art, such as grit based on clay (bentonite) or a composite litter.

If in the course of time the cat litter tray contains excrement and grit material adhering hereto, the user can simply remove these by separating the top sheet 11 of film material from the lower sheets by grasping the relevant handles 7. On lifting the whole up as far as the top of the cat litter tray the separation process takes place and the excrement and the grit particles adhering thereto remain in the bag formed in this way, whilst other litter material passes through openings 3–5 and is returned to the cat litter tray. That is to say only a small quantity of grit material is removed in each cleaning operation. Frequently it is not necessary to add fresh grit material. After the top film sheet 11 has been removed in this way the tray is immediately ready for use. After all, the next sheet 11 immediately takes over the function of the previous sheet. That is to say, the user has to perform no other operation whatsoever on the cat litter tray.

Separation of adjoining sheets of film material is facilitated if the openings of adjoining sheets are made such that they are not in line with one another. This can be achieved in a particularly simple manner by turning the sheets relative to one another during production, but, of course, in such a way that a minimum rotation of 90° always takes place so that the protruding flaps are in line with one another.

It will be understood that numerous modifications can be made to the above which are immediately apparent to those skilled in the art on reading the above description and fall within the appended claims.

What is claimed is:

1. Device for carrying objects comprising a sheet of film material to be fitted in a tray with granular material being placed on top of said film material, said sheet of film material being provided with openings of dimensions such that these allow the granular material but not said objects to pass through, the sheet of film material being essentially rectangular and having cut-outs being made at each of the corner points, wherein said film material comprises a means for closing each opening at said opening, said closing means comprising at least two portions of the film material.

2. Device according to claim 1, wherein said openings are closed off by two semicircular portions of film material.

3. Device according to claim 1, wherein the sheet of film material is provided with apertures embodied as carrying handles close to a periphery of the film material.

4. Device according to claim 1, wherein said openings are circular.

5. Device according to claim 1, wherein said openings are slit-shaped.

6. Device according to claim 1, wherein a main dimension of said openings is between 10 and 17 mm.

7. Assembly comprising at least three devices according to claim 1 placed on top of one another.

8. Assembly according to claim 7, wherein the openings in successive film sheets are not arranged in line.

* * * * *